United States Patent [19]

Urano

[11] 3,719,132
[45] March 6, 1973

[54] ADAPTOR FOR ADJUSTMENT OF VISIBILITY IN VIEWFINDER OF A PHOTOGRAPHIC CAMERA

[75] Inventor: Fumio Urano, Tokyo-to, Japan

[73] Assignee: Asahi Kogaku Kogyo Kabushiki Kaisha, Tokyo-to, Japan

[22] Filed: July 21, 1971

[21] Appl. No.: 164,682

[30] Foreign Application Priority Data

July 30, 1970 Japan ..............................45/76016

[52] U.S. Cl. ................95/11 V, 88/1.5 R, 350/252
[51] Int. Cl. ........................G03b 13/12, G03b 13/02
[58] Field of Search ......95/11 V, 11 R, 42; 88/1.5 R, 88/1.5 NR; 350/140, 301, 178, 250, 252

[56] References Cited

UNITED STATES PATENTS

| | | |
|---|---|---|
| 2,936,685 | 5/1960 | O'Brien et al..........................95/11 R |
| 2,487,773 | 11/1949 | Schwartz et al...................88/1.5 NR |
| 2,127,925 | 8/1938 | Leitz .......................................88/1.5 |
| 2,166,148 | 7/1939 | Heinisch................................88/1.5 |

Primary Examiner—Robert P. Greiner
Attorney—Christie, Parker & Hale

[57] ABSTRACT

An adaptor for adjustment of visibility in the viewfinder of a photographic camera. A lens provides adjustment of the visibility. The lens has a pair of locking projections on the periphery thereof disposed in opposition to each other. A slit in the lens extends adjacent to the portion of the periphery from which one of the projections projects and provides a reduced resiliency to the lens allowing the projections to be collapsed inwardly. A viewfinder eyepiece frame has an opening. A step-like portion in the opening serves to expand the opening. At least two locking grooves are formed on opposing portions of the opening such that the projections are engaged into the grooves.

4 Claims, 3 Drawing Figures

PATENTED MAR 6 1973

3,719,132

INVENTOR
FUMIO URANO

BY

ATTORNEY

ADAPTOR FOR ADJUSTMENT OF VISIBILITY IN VIEWFINDER OF A PHOTOGRAPHIC CAMERA

BACKGROUND OF THE INVENTION

The present invention relates to an adaptor for adjustment of visibility. More particularly the invention relates to an adaptor which, instead of being provided independently of a photographic camera, may be directly mounted in the view finder eyepiece itself for adjustment of visibility and facilitates exchange of the lens for adjustment of visibility.

SUMMARY OF THE INVENTION

A feature of the present invention is that an adaptor for adjustment of visibility is provided which can be directly mounted in the viewfinder eyepiece of the present invention instead of being provided separate from the camera. Also, according to the inventive aspects of the present invention, a low cost adaptor is provided in which the lens is easily mounted in a finder eyepiece frame or removed from the frame as desired for easily changing lenses. Simplicity and ease of manufacture of the lens and eyepiece frame lend them to mass production and low cost of manufacture.

Briefly, an embodiment of the present invention is an adaptor for adjustment of visibility in the viewfinder of a photographic camera. A lens adjusts visibility and the lens has a pair of locking projections on the periphery thereof disposed in opposition to each other. A slit in the lens extends adjacent to the portion of the periphery from which one of the projections projects providing a reduced resiliency to the lens allowing the projections to be collapsed inwardly. A viewfinder eyepiece frame has an opening. A step-like portion in the opening serves to expand the opening. At least two locking grooves formed on opposing portions of the opening allow the lens to be mounted in the opening such that the projections are engaged into the grooves.

BRIEF DESCRIPTION OF THE DRAWINGS

A preferred embodiment of the present invention is shown by the accompanying drawing in which.

DESCRIPTION OF THE PREFERRED EMBODIMENT

Figure 1:
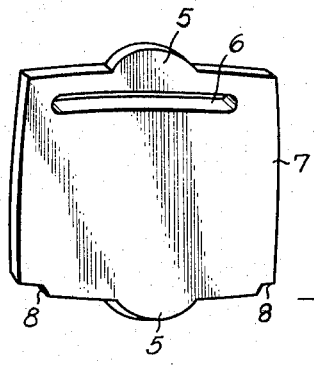
FIG. 1 is a perspective view showing a lens for adjustment of visibility according to the invention.
Figure 3:
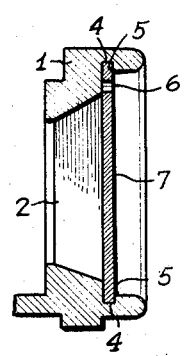
FIG. 3 is a sectional side view of the view finder eyepiece frame in which the lens for adjustment of visibility is mounted.

Now referring to the accompanying drawing, the device according to the present invention comprises a rectangular shaped lens 7 for adjustment of visibility having a pair of locking projections 5 on the periphery thereof disposed in opposition to each other on opposite sides of the rectangular lens. A slit 6 extends substantially in parallel to the side portion of the periphery from which one of the projections 5 projects so that the projections 5 may be collapsed inwardly against elasticity. The lens 7 is mounted in a view finder eyepiece frame 1 having an opening 2, and a step-like portion 3 formed so as to expand the opening 2. Two locking grooves 4 are formed in the inner wall of the opening in opposition to each other so that the projections 5 are engaged into the respective grooves 4.

Reference numeric 8 designates notches for dismounting of the lens 7 from the frame 1 and reference numeric 9 designates a coupling or groove into which a camera accessory is mounted for affixing the frame to a camera.

Lens 7 may be formed of molded high molecular substances such as transparent acryl. Thus formation of the slit 6 as shown by FIG. 1 reduces the resiliency of the lens and gives the locking projections 5 a proper amount of elasticity and thereby, after one of said projections 5 is engaged into the corresponding locking groove 4, the other of the projections 5 may be forced against the elasticity into the other locking groove 4 to mount the lens 7 into the view finder eyepiece frame 1.

For dismounting of the lens 7 from the frame 1, a pincette or the like may be inserted into the notches 8 of the lens 7 and urged upward.

Figure 2:
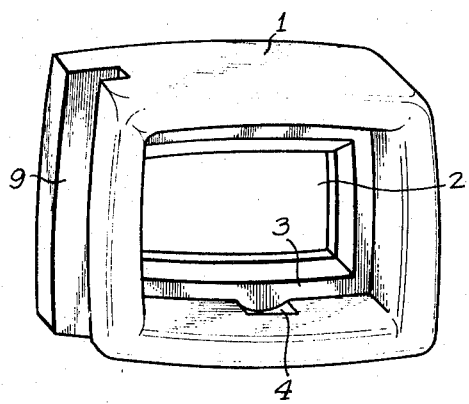
FIG. 2 is a perspective view showing a view finder eyepiece frame to be used with the lens of FIG. 1.

It should be noted here that the locking grooves 4 may be formed in inner walls of the viewfinder eyepiece frame 1 shown at right and left sides as seen in FIG. 2 so as to be opposed to each other, as the case demands.

According to the present invention, as it will be understood from the aforegoing description, the adaptor for adjustment of visibility is directly mounted in the viewfinder eyepiece frame 1 instead of being provided independently of the camera, so that a failure in photographing while on journey due to the adaptor missing or left behind can be avoided. Also, the lens 7 can be quickly exchanged since the lens 7 is easily dismounted from the frame 1 simply by insertion of a pincette or the like into the notches 8 formed in the lens 7.

Moreover, the viewfinder eyepiece frame 1 may be obtained by molding and the portions of the eyepiece frame 1 for mounting of the lens 7 may be formed together with the eyepiece frame 1 itself at one time, so that the device according to the invention is practically advantageous, also in aspects of mass production, cost and camera design.

I claim:

1. An adaptor for adjustment of visibility in the view finder of a photographic camera comprising: a lens for adjustment of visibility comprising a pair of locking projections on the periphery thereof disposed in opposition to each other, a slit in said lens extending adjacent to the portion of said periphery from which one of said projections projects providing a reduced resiliency to said lens allowing said projections to be relatively inwardly collapsed; and a view finder eyepiece frame having an opening, a step-like portion in said opening serving to expand said opening and at least two locking grooves formed on opposing portions of said opening, said lens being mounted in said opening such that said projections are engaged into said grooves.

2. An adaptor according to claim 1 wherein the lens is formed of an elastic material.

3. An adaptor according to claim 1 wherein the lens comprises a peripheral portion adjacent each projection and wherein said slit is substantially parallel to said peripheral portion adjacent one of said projections.

4. An adaptor according to claim 3 wherein said locking groove is adjacent to said step-like portion allowing said lens to be seated thereagainst.

* * * * *